United States Patent
Kim

(10) Patent No.: US 10,761,199 B2
(45) Date of Patent: Sep. 1, 2020

(54) APPARATUS AND METHOD FOR OPTIMIZING ULTRASONIC SIGNAL

(71) Applicant: HYUNDAI AUTRON CO., LTD., Seongnam-si (KR)

(72) Inventor: Hyun Kim, Seoul (KR)

(73) Assignee: Hyundai Autron Co., Ltd., Seoul (KR)

(*) Notice: Subject to any disclaimer, the term of this patent is extended or adjusted under 35 U.S.C. 154(b) by 614 days.

(21) Appl. No.: 15/379,890

(22) Filed: Dec. 15, 2016

(65) Prior Publication Data
US 2017/0168151 A1    Jun. 15, 2017

(30) Foreign Application Priority Data
Dec. 15, 2015 (KR) .................... 10-2015-0179093

(51) Int. Cl.
| | |
|---|---|
| *G01S 7/00* | (2006.01) |
| *G01S 7/527* | (2006.01) |
| *G01S 7/52* | (2006.01) |
| *G01S 7/524* | (2006.01) |
| *G01S 15/10* | (2006.01) |
| *G01S 15/931* | (2020.01) |

(52) U.S. Cl.
CPC ............ *G01S 7/5276* (2013.01); *G01S 7/524* (2013.01); *G01S 7/52006* (2013.01); *G01S 15/10* (2013.01); *G01S 15/931* (2013.01); *G01S 2015/932* (2013.01)

(58) Field of Classification Search
USPC .......................................................... 367/97
See application file for complete search history.

(56) References Cited

U.S. PATENT DOCUMENTS

| | | | | | |
|---|---|---|---|---|---|
| 4,285,010 | A | * | 8/1981 | Wilcox | ................... A61B 8/00 348/163 |
| 4,480,476 | A | * | 11/1984 | Samodovitz | ........ G01S 7/52025 73/627 |
| 4,701,893 | A | * | 10/1987 | Muller | .................. G01S 15/101 367/137 |
| 4,706,227 | A | * | 11/1987 | DuVall | ................... B66B 13/26 187/317 |

(Continued)

FOREIGN PATENT DOCUMENTS

| | | |
|---|---|---|
| JP | 2007-085867 A | 4/2007 |
| JP | 2012-181149 A | 9/2012 |

(Continued)

*Primary Examiner* — James R Hulka
(74) *Attorney, Agent, or Firm* — Baker & Hostetler LLP; Hyunho Park

(57) ABSTRACT

Apparatus and method for optimizing an ultrasonic signal are provided, one of apparatus comprises, an ultrasonic signal sensing unit which transmits and receives an ultrasonic signal, a residual oscillation measurement unit which measures a first ringing time of the ultrasonic signal transmitted from the ultrasonic signal sensing unit, a comparison and calculation unit which compares the first ringing time with a pre-stored second ringing time and calculates a correction frequency based on the comparison result, an electrical damping pulse generation unit which generates an electrical damping pulse having the correction frequency and a control unit which controls the electrical damping pulse to be applied to the ultrasonic signal sensing unit.

9 Claims, 7 Drawing Sheets

(56) References Cited

U.S. PATENT DOCUMENTS

| | | | | |
|---|---|---|---|---|
| 4,868,797 | A | * | 9/1989 | Soltz .................... G01F 23/2962 367/98 |
| 4,947,852 | A | * | 8/1990 | Nassi ..................... A61B 5/028 600/465 |
| 5,183,048 | A | * | 2/1993 | Eberle ..................... A61B 8/12 600/447 |
| 5,373,482 | A | * | 12/1994 | Gauthier ............. B60Q 1/0023 367/13 |
| 6,036,650 | A | * | 3/2000 | Wu ......................... A61B 8/12 600/447 |
| 2008/0037371 | A1 | * | 2/2008 | Chang ................. G01S 7/52004 367/137 |
| 2010/0104114 | A1 | * | 4/2010 | Chapman ................ H04S 7/305 381/103 |
| 2012/0039152 | A1 | * | 2/2012 | Humphrey .......... G01S 7/52004 367/180 |
| 2013/0188798 | A1 | * | 7/2013 | Togawa ................... H04B 3/20 381/66 |
| 2016/0284967 | A1 | * | 9/2016 | Kruecken .............. H01L 41/042 |
| 2017/0041445 | A1 | * | 2/2017 | Ukai ..................... H04M 1/6016 |

FOREIGN PATENT DOCUMENTS

| | | | | | |
|---|---|---|---|---|---|
| JP | 2012181149 | A | | 9/2012 | |
| JP | 2015204535 | A | * | 11/2015 | .......... H04M 1/6016 |
| KR | 1019990026657 | A | | 4/1999 | |
| KR | 10-2007-0066136 | A | | 6/2007 | |
| KR | 1020070087877 | A | | 8/2007 | |
| KR | 1020150043664 | A | | 4/2015 | |

\* cited by examiner

APPARATUS AND METHOD FOR OPTIMIZING ULTRASONIC SIGNAL

This application claims the benefit of Korean Patent Application No. 10-2015-0179093, filed on Dec. 15, 2015, in the Korean Intellectual Property Office, the disclosure of which is incorporated herein by reference in its entirety.

BACKGROUND

1. Field

The present inventive concept relates to an apparatus and method for optimizing an ultrasonic signal, and more particularly, to an apparatus and method for optimizing an ultrasonic signal, the apparatus and method being employed to improve the minimum sensing distance performance of an ultrasonic sensor used in a front and rear parking assistance system by correcting an ultrasonic sensor pulse to minimize the residual oscillation of the ultrasonic sensor.

2. Description of the Related Art

Generally, a parking assistance system using an ultrasonic sensor receives a reflected wave of an ultrasonic wave transmitted from an ultrasonic sensor installed on each of the front and back of a vehicle. The parking assistance system measures a delay time taken to receive the reflected wave and converts the delay time into a distance. Based on the value of the distance, the parking assistance system determines whether there is an object around the ultrasonic sensor.

However, since the parking assistance system determines whether there is an object around the ultrasonic sensor based on a measured distance from the ultrasonic sensor to a vehicle, distance information can be obtained only when an ultrasonic wave is accurately reflected by a vehicle or an object. Hence, malfunctions can arise depending on the location of a vehicle or the surrounding environment.

In addition, malfunctions may arise due to conditions in which an ultrasonic sensor beam is not reflected (e.g., a case where an ultrasonic wave is reflected by the windshield of a vehicle, a case where an upper surface of a vehicle is rounded too much, or a case where no reflected wave is received because an ultrasonic wave is reflected by a front or rear rounded part of a small vehicle due to the small size of the vehicle).

Furthermore, it is required to adjust the sensing distance of the ultrasonic sensor or replace the ultrasonic sensor depending on an environment (indoors or outdoors) in which the ultrasonic sensor is installed. Malfunctions may also arise according to the type of a vehicle. For example, in the case of a truck, an information display malfunction may arise depending on the degree to which goods are piled in a cargo box of the truck. In the case of a tall vehicle, a malfunction may arise due to the non-sensing distance of the ultrasonic sensor.

In addition, residual oscillation of the ultrasonic sensor may increase according to temperature and environment. As a result, the minimum sensing distance performance of the ultrasonic sensor may be reduced. A transducer of the ultrasonic sensor has an operating frequency and characteristics that vary according to the temperature of the surrounding environment. However, since a compensation pulse set in a particular temperature condition is used to reduce the residual oscillation, it is not possible to minimize the residual oscillation in various environmental conditions.

SUMMARY

Aspects of the inventive concept provide an apparatus for optimizing an ultrasonic signal, the apparatus capable of improving minimum sensing distance performance by changing a set frequency of a signal transmitted from an ultrasonic sensor used in a vehicle. Specifically, residual oscillations of a transmitted ultrasonic signal are measured, and a compensation pulse which can minimize the residual oscillations is generated by comparing residual oscillations in a current period with residual oscillations in a previous period.

Aspects of the inventive concept also provide a method of optimizing an ultrasonic signal, the method being employed to improve minimum sensing distance performance by changing a set frequency of a signal transmitted from an ultrasonic sensor used in a vehicle.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

An apparatus and method for optimizing an ultrasonic signal according to the inventive concept are used in a front and rear parking assistance system in order to make up for a reduction in the minimum sensing distance performance of an ultrasonic sensor due to an increase in the residual oscillation of the ultrasonic sensor according to temperature and environment by optimizing the residual oscillation of the ultrasonic sensor. After an ultrasonic sensor transmits an ultrasonic signal, residual oscillation of the ultrasonic sensor is measured, and then a frequency pulse optimally corrected within a parameter range is calculated to optimize the residual oscillation of the ultrasonic sensor.

Specifically, a transducer of an ultrasonic sensor has an operating frequency and characteristics that vary according to temperature. However, a conventional front and rear ultrasonic distance measurement apparatus for vehicles uses, in all temperature ranges, a correction frequency set for an electrical damping pulse in a specific temperature condition. Therefore, it is difficult to generate an optimum correction pulse in various environmental conditions. In addition, due to signal delays between a transducer driver and the transducer, it is difficult to generate an optimum correction pulse. Ultimately, the residual oscillation of the ultrasonic sensor increases according to temperature and environmental changes, resulting in the limited short-distance sensing performance of the ultrasonic sensor.

A method of measuring a distance using an ultrasonic sensor and a driving signal for eliminating residual oscillation of an ultrasonic sensor signal will now be described with reference to FIGS. 1 and 2.

Figure 1:
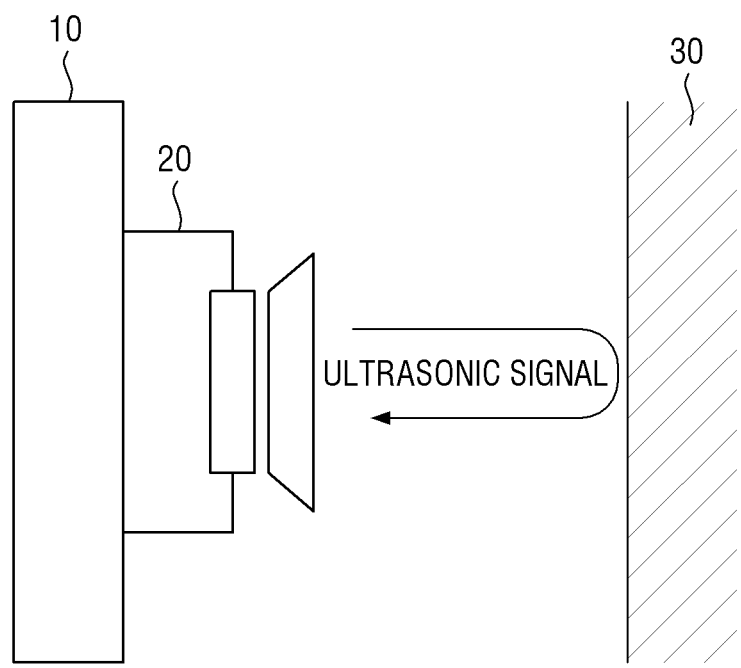
FIG. 1 is a schematic diagram illustrating a method of measuring a distance using an ultrasonic sensor.

FIG. 1 is a schematic diagram illustrating a method of measuring a distance using an ultrasonic sensor.

Referring to FIG. 1, a front and rear parking assistance system for vehicles uses the principle that an ultrasonic sensor measures a distance to an object 30 by calculating the time taken for an ultrasonic signal transmitted from the ultrasonic sensor to return to the ultrasonic sensor after being reflected by the object 30. The ultrasonic sensor includes a semiconductor device 10 and a transducer 20.

The semiconductor device 10 generates an ultrasonic signal and transmits the ultrasonic signal by driving the transducer 20. The ultrasonic signal reflected by the object 30 is input to the semiconductor device 10 via the transducer 20.

The semiconductor device 10 amplifies the received ultrasonic signal and processes an object sensing signal. To sense an object located a large distance from the ultrasonic sensor, transmitted energy may be increased, or the amplification factor of a receiving unit may be increased. Here, to increase the transmitted energy (voltage), a booster can be provided outside the semiconductor device 10.

On the other hand, to sense an object located a short distance from the ultrasonic sensor, oscillations remaining in the transducer 20 are important. After an ultrasonic signal is transmitted through the transducer 20, residual oscillations are present in the transducer 20. The residual oscillations are called 'ringing,' and a time section in which ringing is present is called 'ringing time.'

In the ringing time section, it is difficult to judge an object sensing signal due to residual oscillations. This increases a minimum sensing distance. The minimum sensing distance refers to a minimum value of a distance that can be measured using an ultrasonic sensor.

Therefore, it is important to reduce the ringing time in order to sense an object located a short distance away from the ultrasonic sensor.

Figure 2:
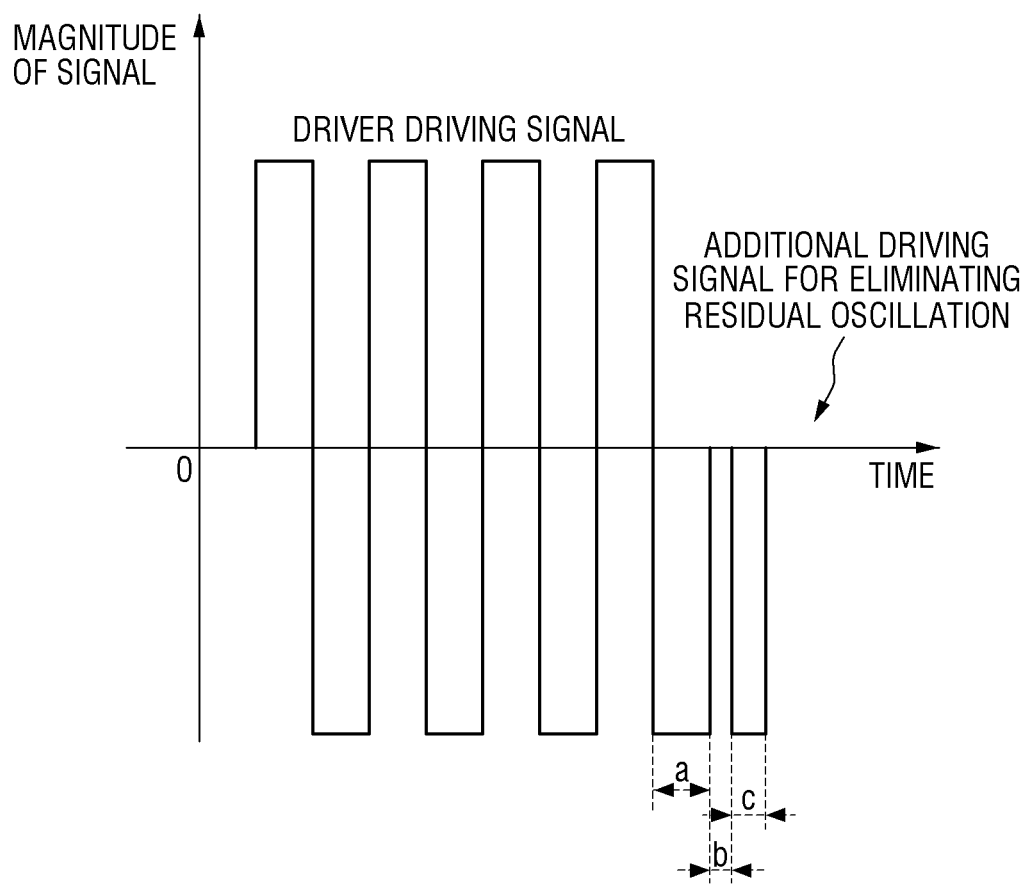
FIG. 2 illustrates a waveform of a driving signal for eliminating residual oscillations of an ultrasonic sensor signal.

FIG. 2 illustrates a waveform of a driving signal for eliminating residual oscillations of an ultrasonic sensor signal.

Referring to FIG. 2, after an ultrasonic signal is transmitted through the transducer 20, a specific pulse (a pulse of section a or section c) such as a reverse signal of a ringing signal may be transmitted to the transducer 20, thereby reducing ringing of the transducer 20. That is, during the ringing time, a reverse phase signal is transmitted to the transducer 20 to offset internal energy. As a result, the ringing time is reduced.

However, the transducer 20 has an operating frequency and characteristics that vary according to temperature. Since a correction frequency set in a specific temperature condition is used in all temperature ranges in the conventional art, it is difficult to set an optimum frequency in various temperature and environmental conditions.

Ultimately, ringing increases according to temperature and environmental conditions, resulting in limited minimum sensing distance performance of the ultrasonic sensor for short distances.

Apparatuses for optimizing an ultrasonic signal according to embodiments will now be described with reference to FIGS. 3 through 6.

Figure 3:
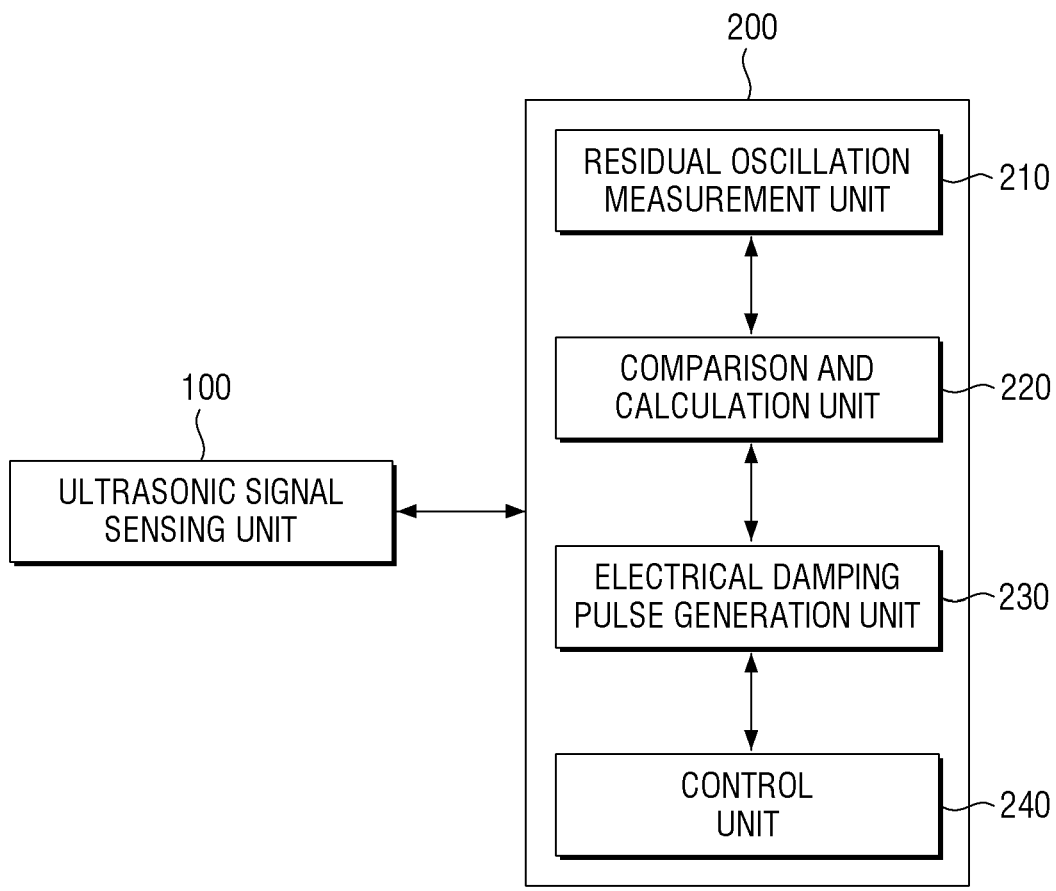
FIG. 3 is a block diagram of an apparatus for optimizing an ultrasonic signal according to an embodiment.

FIG. 3 is a block diagram of an apparatus for optimizing an ultrasonic signal according to an embodiment.

Referring to FIG. 3, the apparatus for optimizing an ultrasonic signal according to the embodiment includes an ultrasonic signal sensing unit 100 and a frequency optimization device 200. The frequency optimization device 200 includes a residual oscillation measurement unit 210, a comparison and calculation unit 220, an electrical damping pulse generation unit 230, and a control unit 240.

The ultrasonic signal sensing unit 100 transmits and receives an ultrasonic signal. The ultrasonic signal sensing unit 100 is installed on the front, back, or side of a vehicle and transmits and receives an ultrasonic signal to measure a distance from an object around the vehicle.

According to the inventive concept, the ultrasonic signal sensing unit 100 may receive feedback information from the frequency optimization device 200 and transmit and receive an ultrasonic signal having a changed frequency.

An ultrasonic signal transmitted from the ultrasonic signal sensing unit 100 may be provided to the frequency optimization device 200 and used to generate an electrical damping pulse for minimizing a ringing time.

The residual oscillation measurement unit 210 may measure a first ringing time of an ultrasonic signal transmitted from the ultrasonic signal sensing unit 100. For the ultrasonic signal, the residual oscillation measurement unit 210 may measure a residual pulse having a different frequency and width from a driving pulse. The first ringing time may be measured by measuring a section in which the residual pulse exists.

In addition, the residual oscillation measurement unit 210 may apply a frequency to the ultrasonic signal sensing unit 100 by variably adjusting the frequency within a preset frequency area. In so doing, the residual oscillation measurement unit 210 may measure the ringing time of the ultrasonic signal sensing unit 100 for each frequency.

The comparison and calculation unit 220 may compare the first ringing time with a pre-stored second ringing time and calculate a correction frequency based on the comparison result. Specifically, if the first ringing time is different from the second ringing time, the comparison and calculation unit 220 may calculate the correction frequency using preset parameter values. That is, when a ringing time is changed, the comparison and calculation unit 220 may calculate the correction frequency using the preset parameter values.

Here, the parameter values may include the frequency of a correction pulse, the location of the correction pulse, and the duration of the correction pulse.

The comparison and calculation unit 220 may store, in advance, the parameter values about the frequency of the correction pulse, the location of the correction pulse and the duration of the correction pulse. When the ringing time is changed, the comparison and calculation unit 100 may calculate the correction frequency using the pre-stored parameter values in order to compensate for the change.

For example, the comparison and calculation unit 220 may include 0 to 15 fields respectively corresponding to correction frequencies. In this case, the comparison and calculation unit 220 may calculate a value corresponding to an optimum correction frequency by applying parameter values corresponding to fields around a specific field based on a correction frequency corresponding to the specific field. Here, other numbers of fields instead of 16 fields can also be included.

Various parameter values may be preset in each of 0 to 15 fields. A specific field (e.g., field 4) may be selected, and a correction frequency corresponding to the specific field may be calculated. Then, the correction frequency may be applied to an ultrasonic signal so as to determine whether the ringing time is minimized.

To determine whether the ringing time is minimized when parameter values corresponding to the specific field (e.g., field 4) are applied, parameter values corresponding to another field (e.g., field 3 or field 5) around the specific field (e.g., field 4) may be applied. This process may be repeated.

That is, a correction frequency calculated using parameter values corresponding to another field (e.g., field 3 or field 5) around the specific field (e.g., field 4) may be applied to the ultrasonic signal so as to determine whether the ringing time is minimized. This process may be repeated a number of times to finally calculate an optimum correction frequency. According to the inventive concept, the process of calculating a correction frequency by changing parameter values to find an optimum correction frequency can be performed automatically. Therefore, it is possible to generate an ultrasonic signal with minimized ringing time in rapid response to temperature and environment changes.

If the comparison and calculation unit 220 calculates an optimum correction frequency, the electrical damping pulse generation unit 230 may generate an electrical damping pulse having the optimum correction frequency.

The control unit 240 may control an electrical damping pulse generated by the electrical damping pulse generation unit 230 to be applied to an ultrasonic signal generated by the ultrasonic signal sensing unit 100, thereby generating an ultrasonic signal with minimized ringing time in the ultrasonic signal sensing unit 100.

Figure 4:
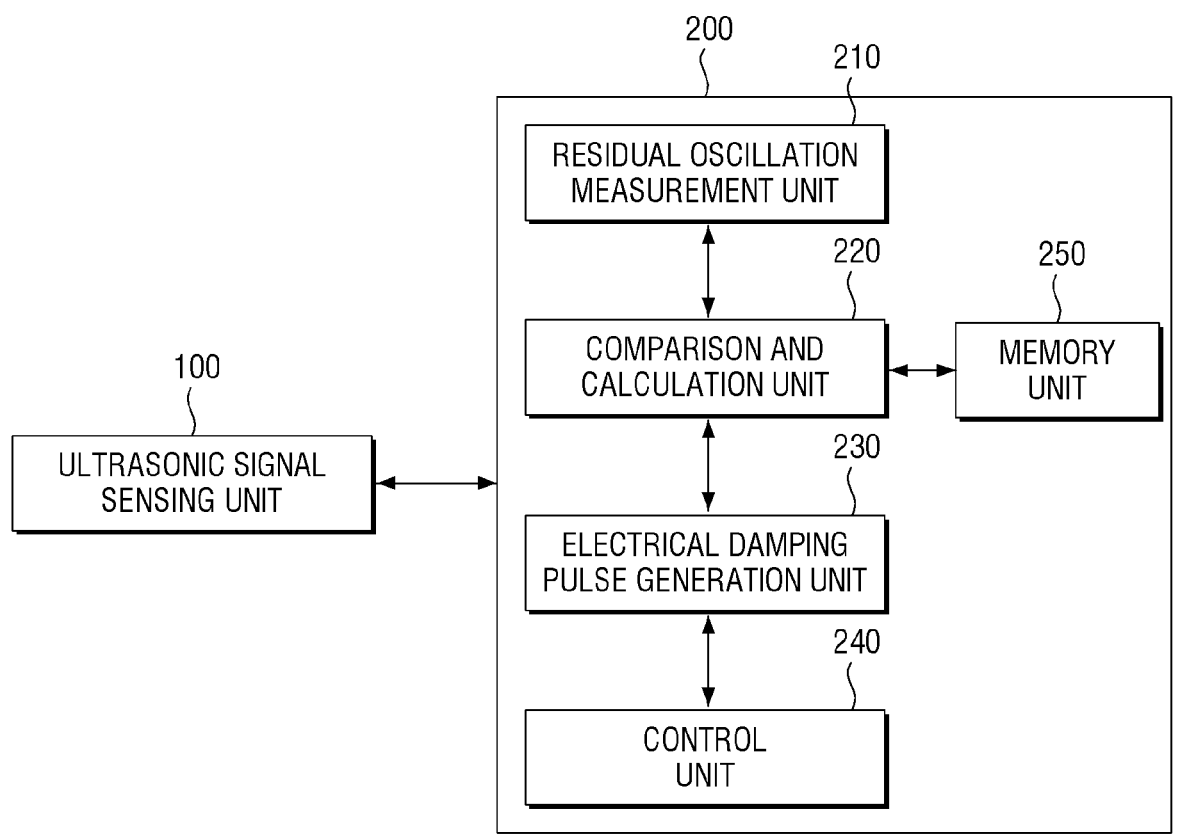
FIG. 4 is a block diagram of an apparatus for optimizing an ultrasonic signal according to an embodiment.

FIG. 4 is a block diagram of an apparatus for optimizing an ultrasonic signal according to an embodiment. For ease of description, a description of elements and features substantially identical to those of the apparatus for optimizing an ultrasonic signal according to the previous embodiment will be omitted.

Referring to FIG. 4, the apparatus for optimizing an ultrasonic signal according to the embodiment includes an ultrasonic signal sensing unit 100 and a frequency optimization device 200. The frequency optimization device 200 includes a residual oscillation measurement unit 210, a comparison and calculation unit 220, an electrical damping pulse generation unit 230, a control unit 240, and a memory unit 250.

The operation of the ultrasonic signal sensing unit 100 and the operation of the residual oscillation measurement unit 210, the comparison and calculation unit 220, the electrical damping pulse generation unit 230 and the control unit 240 included in the frequency optimization device 200 are substantially the same as those described above.

The frequency optimization device 200 may further include the memory unit 250.

The memory unit 250 may store, in advance, information about a ringing time measured before. The information about the ringing time stored in the memory unit 250 may be compared with information about a ringing time measured by the residual oscillation measurement unit 210.

That is, the comparison and calculation unit 220 may transmit and receive data to and from the memory unit 250. The comparison and calculation unit 220 may compare the information about the ringing time received from the residual oscillation measurement unit 210 with the information about the ringing time stored in the memory unit 250 and calculate an optimum correction frequency based on the comparison result.

In addition, the memory unit 250 may store, in advance, information about parameter values necessary for the comparison and calculation unit 220 to calculate an optimum correction frequency. This information may be stored in advance in the form of a lookup table, and the comparison and calculation unit may calculate an optimum correction frequency using the lookup table stored in the memory unit 250.

Various parameter values included in each of e.g., 0 to 15 fields may be stored in advance in the lookup table. Here, other numbers of fields instead of 16 fields can also be provided.

Figure 5:
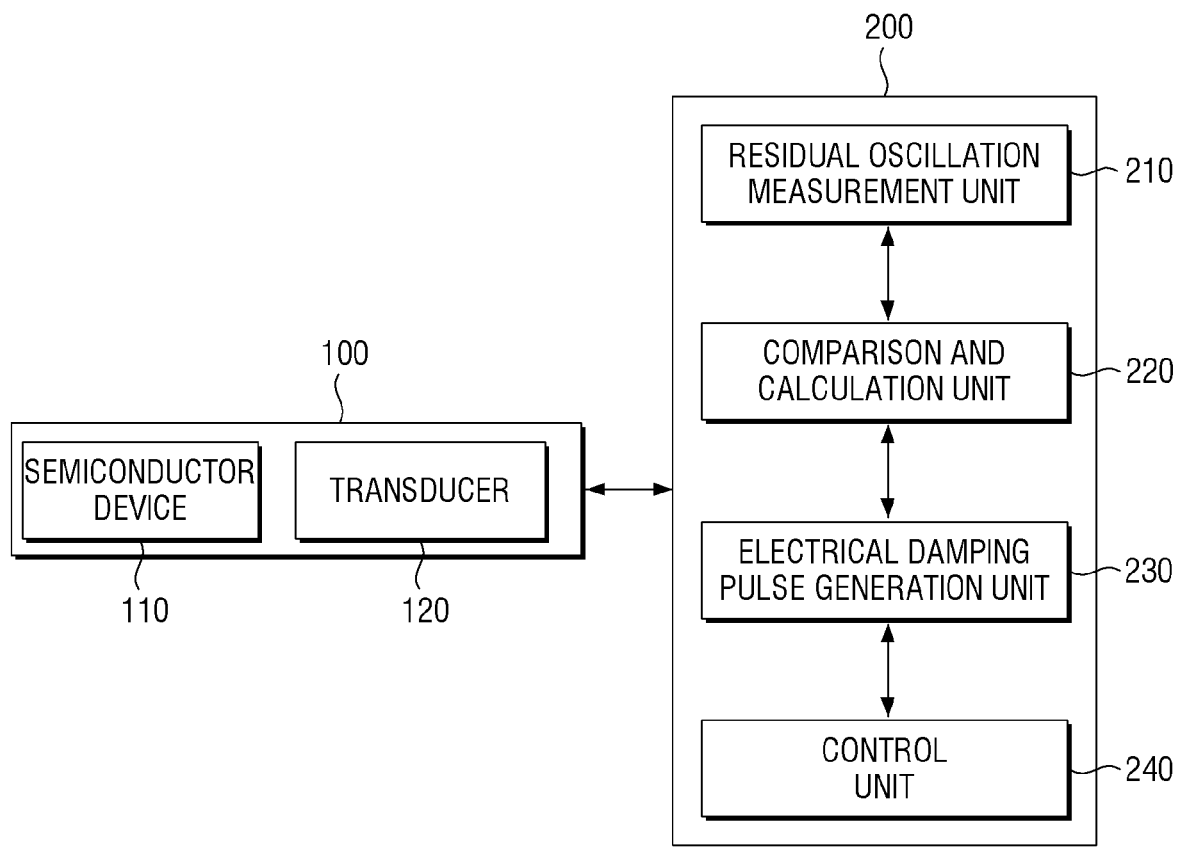
FIG. 5 is a block diagram of an apparatus for optimizing an ultrasonic signal according to an embodiment.

FIG. 5 is a block diagram of an apparatus for optimizing an ultrasonic signal according to an embodiment. For ease of description, a description of elements and features substantially identical to those of the apparatuses for optimizing an ultrasonic signal according to the previous embodiments will be omitted.

Referring to FIG. 5, the apparatus for optimizing an ultrasonic signal according to the embodiment includes an ultrasonic signal sensing unit 100 and a frequency optimization device 200. The ultrasonic signal sensing unit 100 includes a semiconductor device 110 and a transducer 120. The frequency optimization device 200 includes a residual oscillation measurement unit 210, a comparison and calculation unit 220, an electrical damping pulse generation unit 230, and a control unit 240.

The semiconductor device 110 included in ultrasonic signal sensing unit 100 may generate an ultrasonic signal, and the ultrasonic signal reflected by the semiconductor device 110 may be transmitted through the transducer 120.

In addition, the ultrasonic signal reflected by an external object may be input to the semiconductor device 110 via the transducer 120, and the semiconductor device 110 may perform a distance sensing operation. The semiconductor device 110 may amplify the received ultrasonic signal and process an object sensing signal.

According to the inventive concept, another device for increasing transmitted energy or increasing the amplification factor of the transducer 120 may additionally be used to sense an object located a large distance away. To increase the transmitted energy (voltage), a booster can be provided outside the semiconductor device 110.

The residual oscillation measurement unit 210, the comparison and calculation unit 220, the electrical damping pulse generation unit 230 and the control unit 240 included in the frequency optimization device 200 are substantially the same as those described above.

Figure 6:
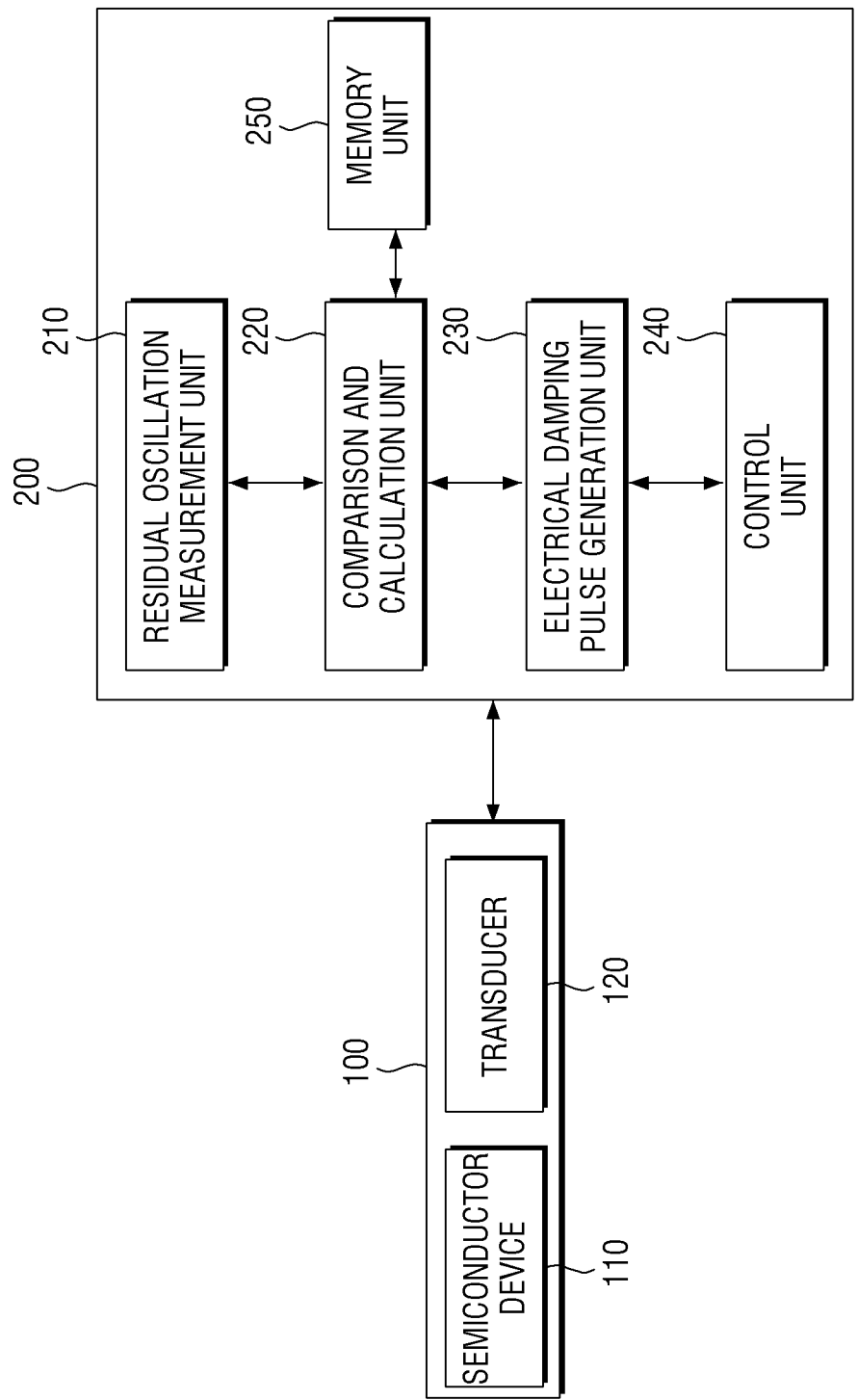
FIG. 6 is a block diagram of an apparatus for optimizing an ultrasonic signal according to an embodiment.

FIG. 6 is a block diagram of an apparatus for optimizing an ultrasonic signal according to an embodiment. For ease of description, a description of elements and features substantially identical to those of the apparatuses for optimizing an ultrasonic signal according to the previous embodiments will be omitted.

Referring to FIG. 6, the apparatus for optimizing an ultrasonic signal according to the embodiment includes an ultrasonic signal sensing unit 100 and a frequency optimization device 200. The ultrasonic signal sensing unit 100 includes a semiconductor device 110 and a transducer 120. The frequency optimization device 200 includes a residual oscillation measurement unit 210, a comparison and calculation unit 220, an electrical damping pulse generation unit 230, a control unit 240, and a memory unit 250.

The residual oscillation measurement unit 210, the comparison and calculation unit 220, the electrical damping pulse generation unit 230, the control unit 240 and the memory unit 250 included in the frequency optimization device 200 are substantially the same as those described above and thus will now be described again.

A method of optimizing an ultrasonic signal according to an embodiment will now be described with reference to FIG. 7.

Figure 7:
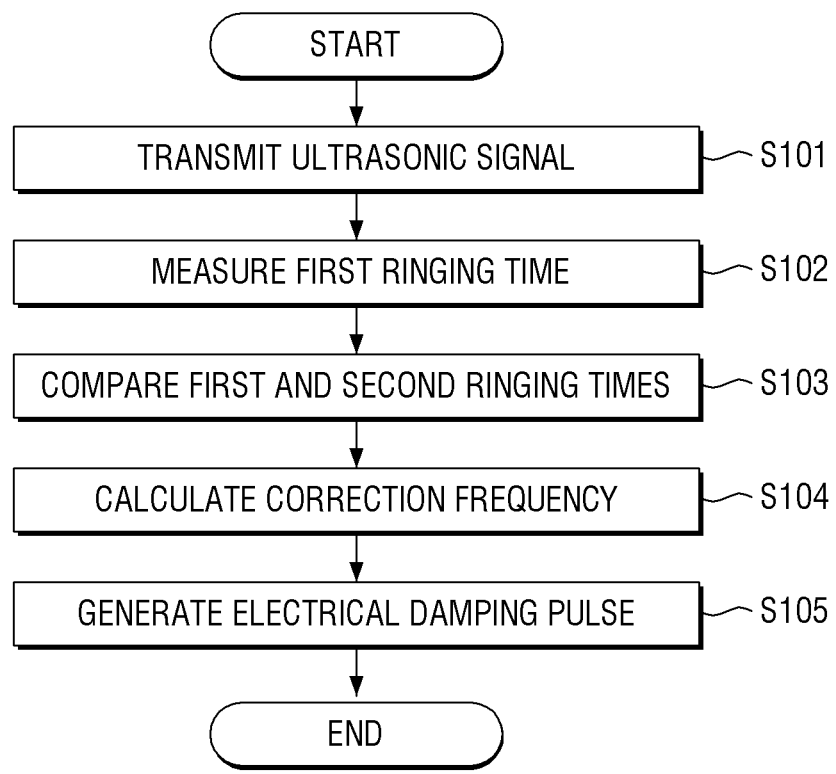
FIG. 7 is a flowchart sequentially illustrating a method of optimizing an ultrasonic signal according to an embodiment.

FIG. 7 is a flowchart sequentially illustrating a method of optimizing an ultrasonic signal according to an embodiment.

Referring to FIG. 7, in the method of optimizing an ultrasonic signal according to the embodiment, an ultrasonic signal is transmitted (operation S101).

Then, a first ringing time of the ultrasonic signal is measured (operation S102) and compared with a second ringing time pre-stored in a memory (operation S103).

If the first ringing time is different from the second ringing time, a correction frequency is calculated (operation S104). The correction frequency may be calculated using preset parameter values. The preset parameter values include the frequency of a correction pulse, the location of the correction pulse, and the duration of the correction pulse.

Specifically, since a different correction frequency is calculated according to an operation condition, after power is applied, an optimum correction frequency is calculated by repeating a search process within a feasible parameter value range. The search process is substantially the same as the process described above.

Once an optimum value of the correction frequency is determined, it is changed only slightly according to temperature and environmental changes. Therefore, the changed optimum value can be easily calculated through the search process.

After the optimum value of the correction frequency is calculated, an electrical damping pulse is generated using the correction frequency (operation S105).

Then, the generated electrical damping pulse is applied to the ultrasonic signal, thereby generating an ultrasonic signal with minimized ringing time.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a user terminal. In the alternative, the processor and the storage medium may reside as discrete components in a user terminal.

According to the inventive concept described above, a correction pulse is generated and applied using an apparatus and method for optimizing an ultrasonic signal in order to minimize residual oscillation of an ultrasonic signal despite various changes in the surrounding environment. Therefore, minimum sensing distance performance of an ultrasonic sensor for vehicles can be improved. In particular, since a correction pulse is generated using parameters such as the frequency of the correction pulse, the location of the correction pulse, and the duration of the correction pulse, an ultrasonic sensor signal with minimized residual oscillation can be automatically generated under various temperature and environment conditions.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation

What is claimed is:

1. An apparatus for optimizing an ultrasonic signal, the apparatus comprising:
    an ultrasonic signal sensing unit which transmits and receives an ultrasonic signal;
    a residual oscillation measurement unit which measures a first ringing time of the ultrasonic signal transmitted from the ultrasonic signal sensing unit;
    a comparison and calculation unit which compares the first ringing time with a pre-stored second ringing time and calculates a correction frequency based on the comparison result;
    an electrical damping pulse generation unit which generates an electrical damping pulse having the correction frequency; and
    a control unit which controls the electrical damping pulse to be applied to the ultrasonic signal sensing unit,
    wherein the comparison and calculation unit calculates the correction frequency corresponding to a specific field using parameter values corresponding to the specific field and parameter values corresponding to another field next to the specific field to determine minimized ringing time and to select an optimum correction frequency based on the determined minimized ringing time.

2. The apparatus of claim 1, wherein, if the first ringing time is different from the second ringing time, the comparison and calculation unit calculates the correction frequency using preset parameter values.

3. The apparatus of claim 2, wherein the parameter values comprise a frequency of a correction pulse, a location of the correction pulse, and a duration of the correction pulse.

4. The apparatus of claim 1, further comprising a memory unit which stores information of the second ringing time.

5. The apparatus of claim 4, wherein the memory unit further stores a lookup table, wherein the comparison and calculation unit calculates the correction frequency using the lookup table.

6. A method of optimizing an ultrasonic signal, the method comprising:
    transmitting an ultrasonic signal; measuring a first ringing time of the ultrasonic signal;
    comparing the first ringing time with a second ringing time pre-stored in a memory;
    calculating a correction frequency corresponding to a specific field using parameter values corresponding to the specific field and parameter values corresponding to another field next to the specific field to determine minimized ringing time and to select an optimum correction frequency based on the determined minimized ringing time; and
    generating an electrical damping pulse having the optimum correction frequency using the correction frequency.

7. The method of claim 6, wherein, in the calculating of the correction frequency, the correction frequency is calculated using preset parameter values.

8. The method of claim 7, wherein the parameter values comprise a frequency of a correction pulse, a location of the correction pulse, and a duration of the correction pulse.

9. The method of claim 6, further comprising applying the electrical damping pulse to the ultrasonic signal.

\* \* \* \* \*